United States Patent [19]

Schönert

[11] 4,357,287

[45] Nov. 2, 1982

[54] METHOD OF FINE AND VERY FINE COMMINUTION OF MATERIALS HAVING BRITTLE BEHAVIOR

[76] Inventor: Klaus Schönert, Berliner Str. 27a, 7500 Karlsruhe 21, Fed. Rep. of Germany

[21] Appl. No.: 152,540

[22] Filed: May 23, 1980

Related U.S. Application Data

[63] Continuation of Ser. No. 878,758, Feb. 17, 1978, abandoned.

[30] Foreign Application Priority Data

Feb. 24, 1977 [DE] Fed. Rep. of Germany ....... 2708053

[51] Int. Cl.³ .............................................. B28B 7/04
[52] U.S. Cl. ......................................... 264/39; 264/82; 264/109; 264/115; 264/118
[58] Field of Search ................... 264/39, 82, 109, 115, 264/118

[56] References Cited

U.S. PATENT DOCUMENTS

| | | | |
|---|---|---|---|
| 2,729,855 | 10/1956 | Titus et al. | 264/109 |
| 3,255,285 | 6/1966 | Chilson | 264/109 |
| 3,490,702 | 1/1970 | Dore | 241/29 |
| 3,797,758 | 3/1974 | Cherdron et al. | 241/29 |
| 3,860,682 | 1/1975 | Reinhardt et al. | 264/118 |
| 3,986,864 | 10/1976 | Hofmann et al. | 264/118 |

Primary Examiner—James R. Hall
Attorney, Agent, or Firm—Kenyon & Kenyon

[57] ABSTRACT

In order to carry out a fine and very fine comminution of brittle material, a bed of bulk material to be comminuted is first stressed between two practically nonyielding hard surfaces with a compression of at least 500 kg/cm² to result in energy sufficiently high not only to cause comminution, but to also cause a distinct agglomeration or briquetting of the particles, whereafter the resulting agglomerates or briquettes are disintegrated by further mechanical stressing in a separate device.

25 Claims, 8 Drawing Figures

METHOD OF FINE AND VERY FINE COMMINUTION OF MATERIALS HAVING BRITTLE BEHAVIOR

This is a continuation of application Ser. No. 878,758 filed Feb. 17, 1978, now abandoned.

This invention relates to a method of fine and very fine comminution of materials having brittle behavior, in particular for comminuting materials for cement production, cement clinker, ores, and coals, as well as lime, bauxite, dolomite, alkaline earth carbonates, and similar minerals.

A substance exhibits brittle behavior if, prior to beginning to crack, the solid body is deformed largely elastically. Typical brittle substances are glass, quartz, cement clinker, coal, and limestone, and many minerals. If material to be ground exhibits brittle behavior, it can be disintegrated by subjecting it once to compression or impact stress, provided the intensity of the stress applied is great enough. In contrast, inelastic behavior in a substance can be recognized by clear inelastic deformations prior to the beginning of any crack formation. The disintegration of inelastic particles requires that they be subjected at various times to stress and, if at all possible, at sharp edges. Thermoplastic polymers (e.g. polyethylene, polyamide), organic chemicals, and plastic metals belong to the group of inelastic materials.

The terms fine and very fine, or finest, comminution characterize the degree of fineness of the product, in particular the upper limit of the particle size range. In the case of fine comminution the range lies between 50 and 100 $\mu$m, whereas it reaches from 2 $\mu$m to 50 $\mu$m with very fine comminution. The mills or grinding equipment used for fine and very fine fragmentation of brittle substances are ball mills, vibration mills, roller or ring mills, stirring ball mills, disc mills, impact mills, fluid energy or jet mills and the like. The selection of the most convenient type of grinding machinery, in the first place, depends on the hardness of the material to be pulverized, the desired degree of fineness, the throughput, and on the question of whether the grinding process may be or must be carried out in a wet or dry manner. As a general rule, impact mills are not used when the hardness is in excess of 4 on the Mohs scale because the wear would be too great. Wet grinding is preferred to dry grinding as the degree of fineness increases because, in the wet system, the fragments hardly tend to agglomerate. And, finally, ball mills are especially well suited for hard materials and/or high throughputs of more than 10 tons per hour.

The agglomeration of fragments poses a general problem in the fine and finest comminution. The tendency for fragments to agglomerate becomes more acute as the particle size diminishes. This is so for two reasons:

First, as the particle size becomes smaller, the strength increases so that greater forces per unit area must be applied to effect disintegration. In general, these great forces continue to act on the fragments which result from the comminution process and are normally located close to one another. At the points of contact the particles suffer a lasting plastic deformation; greater contact areas are formed and, as a consequence, the adherence becomes stronger; the fragments agglomerate.

Secondly, the forces of adhesion are directly proportional to the particle size, while the mass forces are proportional to the third power of the particle size. Below a certain particle size the forces mentioned first are greater than the second ones. The mass forces are no longer sufficient to break up the agglomerated clusters.

For this reason it is a generally adopted practice nowadays to prevent the agglomeration by specific measures in the fine and finest comminution or, if that is not possible, to keep the size of agglomerates or their portion small or to break up or to disintegrate the agglomerates as soon as possible after their formation.

A two step grinding method subjecting a bulk of particles in a first step to cyclic stressing in an elastic vessel until the material has been comminuted to an aggregation state and in a further step to wet comminution in a vibration mill is not commercially useful and not satisfactory from an energy consumption standpoint.

In all methods of pulverization applied, so far, the prevention of agglomeration has been attempted with great efforts by the following measures:

The particles and the fragments are dispersed in a gaseous medium in impact mills or jet mills or in a liquid medium in wet grinding mills.

A shearing stress is added, combined pressure and shear stress is applied in ball mills, vibration mills, stirring ball mills, roller mills, and disc mills.

The quantity of the material to be ground in one type of stressing is reduced because the formation of agglomerates is ever more noticeable the greater the number of particles which are close to one another when subjected to stress. In ball mills, vibration mills, and stirring ball mills this is realized by using grinding bodies as small as possible so that the amount of material compressed between two grinding bodies is reduced.

The intensity of stress is reduced in order that fewer fragments will result from an act of stressing and these will be loaded by a smaller force. This, however, requires an increase in the number of times the stress is applied in order to finally obtain the same degree of fineness of the product. Attempts to realize this are made in ball mills, vibration mills, and stirring ball mills by using small grinding bodies.

The fine product is removed as soon as possible after it is formed so that it will not enhance agglomeration during subsequent applications of stress. This is done especially with jet mills, impact mills, and roller mills.

Resulting agglomerates are disintegrated by subsequent applications of stress in the same mill as the grinding proceeds. This is being done in most of the above mentioned mills. In two-step comminution processes the agglomerates resulting in the first step may be ground together with the remainder of the material subjected to further comminution in the second step to obtain the desired final degree of fineness.

Liquids or vapors are added which, when adsorbed by the fragments, reduce the forces of adhesion and thus render the formation of agglomerates more difficult. Such reagents, called grinding additives, are used above all in the very fine grinding in ball mills.

Fine and very fine grinding involves considerable energy expenditure, e.g., the grinding alone in the production of normal Portland cement PZ 275 requires from 25 to 35 kWh/t; in this process a surface area per mass unit between 2500 and 3000 cm$^2$/g is produced. The values for the utilization of energy, i.e., the quotient of the increase of the surface area and of the energy consumption, vary between 80 and 150 cm$^2$/kWh. To obtain a product having particles smaller than 10 $\mu$m, from fifty to several hundred kWh/t must be applied, depending on the substance and type of grinding equipment used. The greatest part of the energy supplied to a mill is lost and not used for pulverizing the particles or creating new surface. Detailed investigations on single particles have shown that only less than half of the energy is necessary for the creation of new crack surfaces. The losses are caused by ineffective measures in applying the stress and in transporting the material and by friction of bearings and transmissions, and, in addition, by the acceleration of the particles as well as by internal and external friction of the fluid in the case of impact and jet mills.

SUMMARY OF THE INVENTION

It is the object of the invention to provide a method which permits fine and finest comminution of brittle materials with a relatively low energy consumption and with a relatively low expenditure for machinery.

This object is met, in accordance with the invention, in a method with which the particles to be ground are stressed and comminuted in the form of a bed of bulk material between two practically non-yielding hard surfaces, by the fact that, the particles to be ground are stressed once by an energy sufficiently high not only to cause comminution but also distinct agglomeration or briquetting of the fragments by subjecting the bed to compression of at least 500 kg/cm$^2$ (7000 psi), and in that the resulting agglomerates or briquettes are subsequently disintegrated by further mechanical stressing in a separate device.

It is characteristic for the invention that a bed of bulk material of the particles to be ground is subjected to a determinate stress between two hard surfaces by applying so much energy that a very substantial comminution takes place regardless of the fact that the fragments clearly agglomerate at the same time. In general, this first stressing is to be carried on to such an extent that compacting or briquetting takes place in order to obtain the desired degree of fineness, in particular in the case of very fine comminution. The stressing in this case is effected by subjecting the bulk material to a compression in excess of 500 kg/cm$^2$ (7000 psi), preferably of 800 kg/cm$^2$ (11500 psi). When comminuting hard materials, such as cement clinker, a compression of 1000 kg/cm$^2$ (15000 psi) is advantageous. The very fine comminution, e.g., of lime, is best carried out at an even higher compression of, for instance, about 1500 kg/cm$^2$ (2000 psi). The energy required is applied to the same bed of bulk material in one instance of stressing. If the fragments formed are to be stressed again, the bed including the agglomerates or briquettes is to be loosened by subjecting it to the mechanical action of corresponding tools. The bulk material which may either be dry or to which liquid may have been added is transported to the working surfaces of the grinding tools by a determinate transport.

Prior to and/or during the stressing between the non-yielding surfaces, the particles to be ground may also be exposed to the vapor of an anti-agglomeration liquid. The stressing may be effected in a pressure chamber with the liquid and or vapor under high pressure. It may be convenient for the stressing to be carried out in a pressure chamber in which the gas pressure is below atmospheric pressure or smaller than the partial pressure of the anti-agglomeration vapor.

It is of advantage to have the high pressure drop instantaneously after an act of stressing. The effect can be enhanced by charging the liquid with a water-soluble gas prior to the stressing of the bed of bulk material.

The stressing or comminution up to the point of briquetting in may be effected by using roller mills, in particular with cylindrical rollers, ring mills, briquetting presses, in particular roller briquetting presses, and ram presses or the like, provided they are designed for the required extremely high compression forces.

The further mild stressing to destroy the agglomerates or briquettes formed in the first stressing can be carried out by impact stressing, for instance, in an impact mill or by a combination of pressure and shear stress, for instance, in a ball mill. If desired this process may be enhanced by adding a liquid, preferably water to wet the agglomerates or briquettes.

The product leaving the disagglomeration step in general is classified by means of a sieve or screen, an air classifier or a hydrocyclone, to render a final product fine fraction and a coarse fraction. The coarse fraction thus obtained is recycled to be stressed again between the non-yielding surfaces, if the desired degree of fineness had not yet been obtained. In any case, the energy consumption is less than with comparable known comminution processes, provided the unique stressing the surfaces is effected with sufficient compression that at least 30%, preferably at least 50% of the fragments will have the desired final fineness of the product.

In a specific embodiment of the method according to the invention for fine comminution of raw materials for cement production, cement clinker, ores, coals, as well as lime, bauxite, dolomite, and similar alkaline earth carbonates, it is provided that a bed of particles to be ground is stressed once, either in a roller mill in which a roller body rolls off a rolling surface or preferably in a roller mill of the kind having two counter-rotating cylindrical rollers, by subjecting the bed to a compression of at least 800 kg/cm$^2$ (15,000 psi), and that the resulting agglomerates are subsequently disintegrated in a ball mill or impact mill.

In another embodiment of the method according to the invention for very fine comminution, in particular of quartz, limestone, feldspar or the like it is provided that a bed of particles to be ground is stressed once, either in a roller mill in which a roller body rolls off a rolling surface or preferably in a roller mill of the type having two counter-rotating cylindrical rollers, by subjecting the bed to compression of at least 1500 kg/cm$^2$ (20,000 psi), and that the resulting agglomerates are subsequently disintegrated in a ball mill or impact mill.

Often it will not be possible, in either case, to achieve values for the energy transmitted to the bed by the high compression means which are high enough that the size of all the resulting fragments will be below the admissible upper limit of the particle size of the desired final product. Yet it is convenient to subject the bed of particles to be ground to compression high enough that at least 30%, and preferably at least 50% of the fragments will already have the desired fineness of the final product. In this event, a modification of the method according to the invention provides for a separation of the final product discharged from the ball mill or impact mill into a final product fine fraction and a coarse fraction which is recycled and added again to the in-feed of the first step, such as by introducing it into the roller mill. Such a mill-classifier circuit is known per se and used, for example, in the cement industry. If the method is carried out in the way described, energy savings of more than 10% can be obtained.

When the stressing and transportation are called "determinate", it is intended to make it clear that both are predetermined, by the way the method is conducted or the operation is adjusted, rather than by such things as the quantity of the material subjected to stress or the fact that the stressing energy might adopt some stochastically or randomly different values, such as occurs in a ball mill.

DETAILED DESCRIPTION OF THE PREFERRED EMBODIMENT

The method according to the invention is in contrast to the general teaching that every effort should be made to prevent the formation of agglomerates in the one-step fine and finest comminution to the final degree of fineness. Instead, the formation of agglomerates or briquetting is expressly aimed at or, at least, put up with, in order to effect the greatest possible disintegration of or damage to the particles in the bed of bulk material. This requires forces per unit area between 500 and 5,000 kg/cm² or 7,000 and 70,000 psi, depending on the material and fineness. So far such high loads have not been used in grinding processes. Calculations have proved that the compressions to which beds of particles were subjected up to now always remained well below 200 kg/cm² or 3000 psi. At such low loading, the degree of comminution is small so that a great amount of unground material must be subjected to many more instances of stressing in order to obtain the required degree of fineness.

Figure 1:
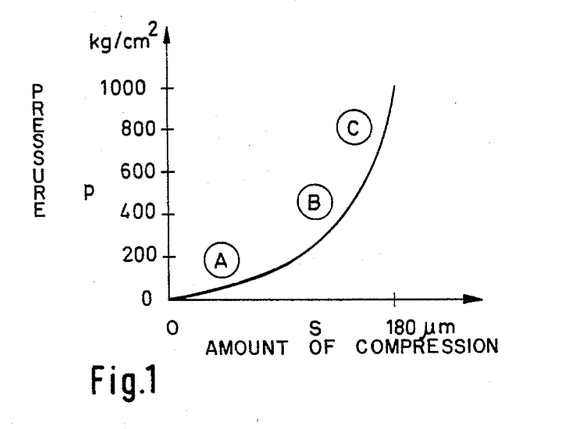
FIG. 1 is a load diagram helpful in understanding the problem which the present invention solves.

The difficulties will be explained with reference to FIG. 1 showing the load diagram for bulk material consisting of cement particles of a size of 1 mm compressed between two hard surfaces. The amount of compression of the material, s, is entered on the abscissa, while the pressure p is to be found on the ordinate. Amount of compression means the amount of reduction in size, e.g., from 1 mm to 900 μm, would be a compression of 100 μm. Up to a pressure p of approximately 200 kg/cm² or 3000 psi the force rises only insignificantly as the amount of compression (reduction in thickness of the bed of bulk material) increases (curve section A). After a short transition range (curve section B) the curve becomes very steep and a great increase in pressure is required in order to enforce further compression (curve section C). It is only after the transition range that the briquetting begins. The steep pressure rise of curve section C is a typical indication thereof. Heretofore, in mills the pressures were selected such that the loading remained within curve section A; in exceptional cases only would it go into curve section B.

Figure 2:
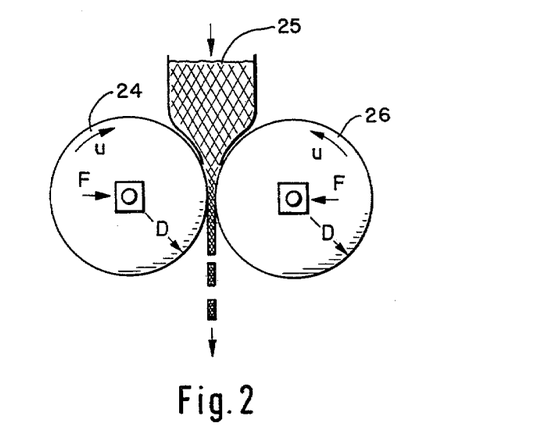
FIG. 2 is a schematic representation of one type of apparatus for carrying out the method of the present invention.

The method in accordance with the invention, however, is based on applying a load in correspondence with curve section C. If the method of the present invention is implemented, for example utilizing a mill in which the particles to be ground are supplied in the form of bulk material 25 which is stressed between two cylindrical rollers 24 and 26 rotating at the same circumferential speed but in opposite directions, assuming a roller diameter of 100 cm and a length L along the axis, a force F per unit length of F/L equal to more than 200,000 kg/m would be required in order to meet the stressing condition of the present invention. In roller mills of conventional structure for coarse and medium comminution the forces applied are less than one tenth of this value.

Figure 3:
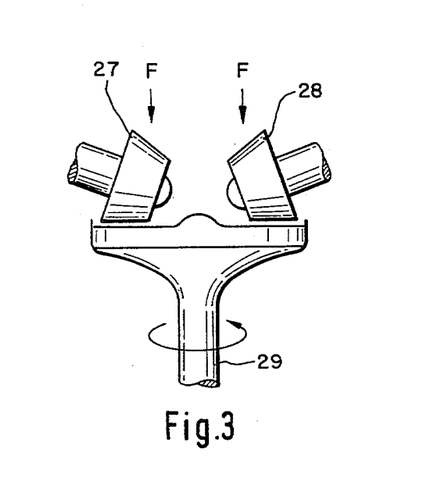
FIG. 3 is an elevation view of another type of apparatus for carrying out grinding in accordance with the present invention.

For medium and fine comminution of brittle materials which are not too hard (such as coal, raw material for the manufacture of cement) roller mills used in which a bed of particles to be ground is stressed several times between rotating grinding bodies having the shape of rollers or balls and a plane or curved grinding surface are often used. The use of roller shaped (or frustoconical) grinding bodies 27 and 28 in cooperation with a plane grinding disc 29, is embodied in the Loesche mill, see FIG. 3. Roller mills having a roller body rolling on a grinding disc and particularly a roller mill having counter rotating rollers pressed against each other are best suited for comminution of a bed of bulk material in accordance with the method of the invention. With all known Loesche mills, compression forces of approximately 30000 to 70000 kg/m of roller length are applied, in other words, values which are much smaller than the above mentioned figure of 200000 kg/m of roller length.

Figure 4:
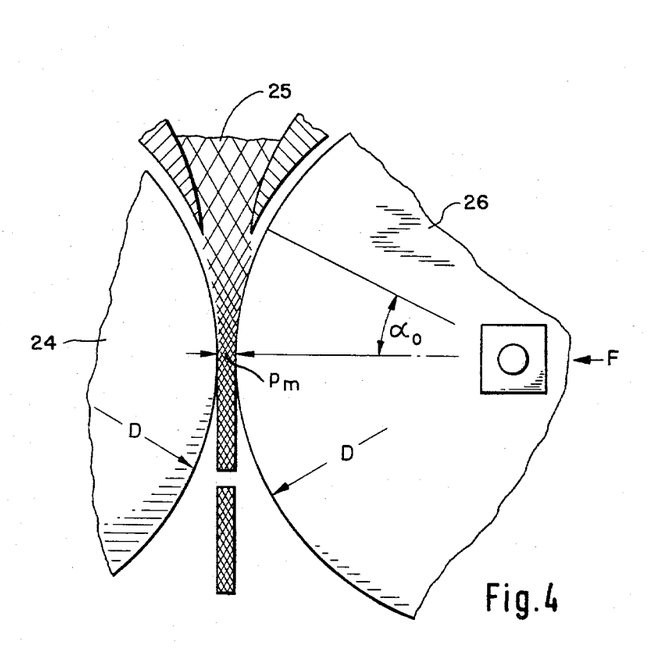
FIG. 4 is an exploded view of a portion of FIG. 2 illustrating the various parameters of interest in carrying out the method of the present invention.

FIG. 4 shows how the compression force F, roller diameter D, roller axial length L, and maximum grinding pressure $p_m$ which acts on the bed in the narrowest section of the nip are inter-related in accordance with the following equation:

$$F/LD = k\alpha_o p_m,$$

wherein:
$\alpha_o$ = angle at which the stressing begins and
k = a constant dependent on the material behavior and having a value of about 0.2 in general.

The method according to the invention necessitates that the grinding pressure be selected high enough that a distinct formation of agglomerates or briquettes takes place. In general this requires the grinding pressure $p_m$ to be increased to more than 500 kg/cm² or 7000 psi. The compression force of the rollers per meter of roller length (F/L) results, in accordance with the above equation, as being proportional to the roller diameter D and the chosen angle $\alpha_o$. For the value F/L=200000 kg/m given above and for D=100 cm, $\alpha_o$=0.1 (corresponding approximately to 6°), and k=0.2, a grinding pressure of $p_m$=1000 kg/cm² or 14000 psi results.

Figure 5A:
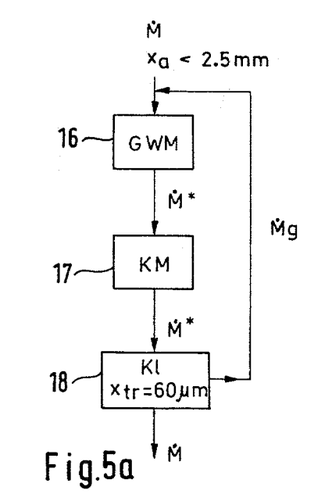
FIG. 5a is a flow diagram of a plant for carrying out the method of the present invention.

Tests have shown that the method according to the invention permits considerable savings of energy. In the production of normal Portland cement PZ 275 the comminution requires only from 10 to 20 kWh/t instead of 25 to 35 kWh/t. The new method can be carried out in a plant of the type illustrated by the block or flow diagram of FIG. 5a. It consists of a mill 16 called GWM. Mill 16 is a roller mill for grinding a bed of bulk material, for instance, a roller mill having two cylindrical rollers driven in a counter rotating sense, such as shown in FIGS. 2 and 4, or another type of roller mill; a ball mill KM 17, and an air classifier Kl 18 having its separation limit $x_{tr}$ at 60 μm. The pre-crushed material, all the particles $x_a$ of which are smaller than 2.5 mm, is supplied to mill 16 at a feed rate $\dot{M}$ and the recycled coarse material from the air classifier Kl 18 is supplied to the mill 16 at a feed rate $\dot{M}_g$. The stressing between the rollers effects comminution and briquetting. The resulting product is compressed to flake-shaped briquettes which are disagglomerated or disintegrated in the ball mill 17 connected downstream. The product leaving the ball mill contains approximately 40% of particles which are smaller than 60 μm. The air classifier Kl 18 separates the major part thereof into an end product which leaves the mill-classifier circuit at a product rate $\dot{M}$. The recycled coarse material is mixed with the pre-crushed feed material and again supplied to roller mill 16. The total flow rate $\dot{M}^*$ through the mill is divided by the air classifier Kl 18 into two fractions, the fine fraction leaving the circuit at the product rate $\dot{M} = p' \cdot \dot{M}^*$, the coarse fraction rate being recycled at a flow rate $(1-p') \cdot \dot{M}^*$. If the product rate is assumed, for example, to be $\dot{M} = 100$ t/h and $p' = 33\%$, the flow rate through the mill and the air classifier will be $\dot{M}^* = 300$ t/h. The energy required by the roller mill 16 for the bed of bulk material amounts to 3.1 kWh/t and that of the ball mill 17 amounts to 1.4 kWh/t. The sum of both is 4.5 kWh/t. The specific energy consumption of the circuit based on the production rate is calculated to amount to approximately 13.6 kWh/t. If, furthermore, 20% of the gross energy input is considered to the lost in the engine transmission, and machines, the resulting specific energy consumption will be about 17 kWh/t.

Figure 5B:
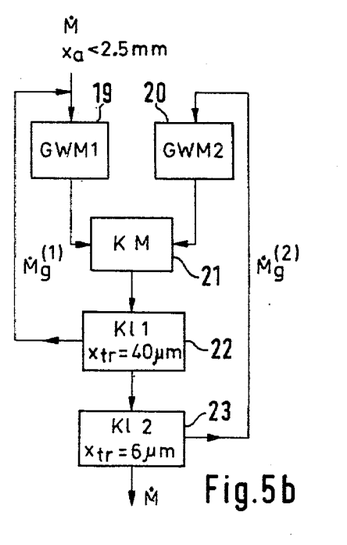
FIG. 5b is a similar diagram for an alternate type of plant.

FIG. 5b shows a block flow diagram of plant comprising two roller mills for grinding a bed of bulk material, GWM1 19 and GWM2 20, one ball mill 21, and two air classifiers Kl1 22 and Kl2 23. Subdividing the stressing of the bed of bulk material into two steps establishes an advantage from the point of view of the process technique and may also be favorable with respect to the overall economy.

When applying the novel method, the finest comminution of limestone to a product of which 100% is smaller than 10 μm requires compression of about 1,500 kg/cm² (2,000 psi) and only about 10 kWh/t. Optimum operating conditions can be found for every task. For example, the pulverization of cement is most economical at grinding pressure between 1000 kg/cm² or 15,000 psi and 2,500 kg/cm² or 35,000 psi.

The method according to the invention further provides for the possibility of adding liquid to the bulk material. This may be water, as in ore or mineral dressing or a liquid other than water when comminution or dispersion processes as in chemical or foodstuff processes are concerned.

Figure 6:
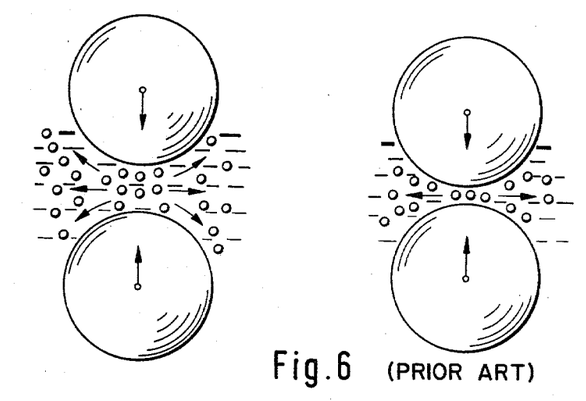
FIG. 6 is a diagrammatic view of a type of grinding apparatus utilizing balls which can be used in carrying out the present invention.

Wet grinding in mills containing loose grinding bodies (e.g. ball mills or stirring ball mills) or in disc mills is a known method which is preferably applied when the material to be ground is supplied in wet condition or must be processed while wet and if the pulverization is to be very fine, producing particles smaller than a few microns. In this case, the liquid on the one hand prevents the fragments from agglomerating and on the other hand makes it more difficult to subject the particles to load because, to a certain extent, they follow the liquid which flows out from the zone of stressing as the grinding bodies approach each other. FIG. 6 is a diagrammatic representation of this state of the art in which balls 30 are used as grinding bodies.

When applying a wet process in accordance with the invention the above mentioned disadvantageous effect does not occur. The particles which are subjected to stress cannot follow the outflowing stream so as to evade the stressing because they are withheld by the grinding force. The addition of a liquid has two consequences.

(a) The internal and external friction of the bulk material is reduced so that the necessary compression work is less for a specific final compression. The degree of reduction in size remains the same or is even enlarged, as tests have demonstrated surprisingly. For example the stressing of limestone particles having a particle size in the range between 100 μm and 160 μm with a grinding pressure of 1000 kg/cm² or 15000 psi requires 1.7 kWh/t if the bed is dry and 1.4 kWh/t if the bed is wet. In the first case the fine fraction of particles smaller than 10 μm is 20% and in the second case, with a wet bed, it amounts to 30%.

(b) The liquid reduces the strength of the agglomerates or briquettes so that less energy is required to disintegrate them.

In the process of comminuting brittle material when pressure is applied to the larger particles to be comminuted, cracks occur, i.e., the material splits or cracks into a number of pieces. Hereinafter, the surfaces which occur when the material breaks are called crack surfaces. It is these surfaces which join to each other during agglomeration. The space between adjacent crack surfaces will hereinafter be called crack gaps.

In the wet grinding process the disagglomeration can be facilitated by two further measures:

1. The liquid is subjected to hydrostatic pressure before and during the stressing, and at the end of the stressing cycle the pressure should be reduced as instantaneously as possible. The pressure causes improved penetration of the liquid into the crack gaps by which the forces of adhesion are reduced accordingly. The sudden pressure release causes a loosening of the agglomerate because of the internal pressure thus generated. In view of the narrow capillaries in the agglomerate the pressure in the interior thereof drops much more slowly than outside.

Figure 7:
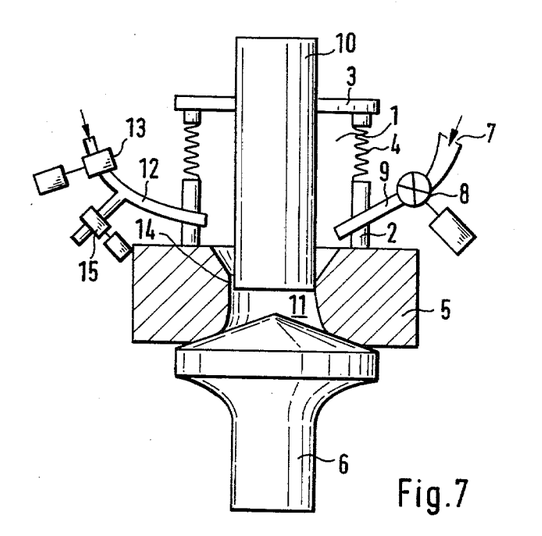
FIG. 7 is a similar view illustrating another type of apparatus which can be used in carrying out a variation of the present invention.

FIG. 7 is a diagrammatic presentation of a possible apparatus for realizing the comminution and briquetting and the instantaneous pressure reduction step at the end of the first step. The ram press shown comprises a pressure chamber 1 which is closed off from the outside by side wall 2 and wall 3, a bellows 4, a cylinder 5, and a lower ram 6. The material to be ground and the liquid are delivered into an inlet 7 and pass through a magnetically operated valve 8 and a passage 9 into pressure chamber 1. When the upper ram 10 is retracted, a compression chamber 11 is filled. During this time the lower ram 6 is pressed against cylinder 5. The liquid is pressurized by compressed air supplied through a pressure line 12 provided with a magnetic valve 13 and opening into pressure chamber 1. When the upper ram 10 stresses the bulk material, the liquid displaced is allowed to flow out through axial circumference grooves 14 formed in the cylinder.

Upon relief of the upper ram 10 a magnetic valve 15 in a branch of pressure line 12 is opened and instantaneously reduces the pressure. Lower ram 6 falls down, and upper ram 10 presses the material out of the slightly conically shaped cylinder 5, if necessary. Then lower ram 6 is again pressed into cylinder 5 and upper ram 10 is retracted so that the compression chamber can be filled once more with new material.

2. The second measure resides in charging the liquid in addition with a gas which is easily dissolved in the liquid, such as $CO_2$. Upon a sudden pressure reduction, the gas is partly released and thus the internal pressure in the crack gaps is increased.

Another means of facilitating the disagglomeration resides in adding an anti-agglomeration liquid, such as ethylene glycol. As the effect hereof depends on the vapor reaching the newly formed crack surfaces before agglomeration takes place, it is provided, in accordance with the method of the invention, either to increase the gas pressure or to lower it below the vapor pressure of the anti-agglomeration liquid (grinding additive). In the first case the gas flows more quickly than at normal pressure into the crack gaps and entrains the effective vapor, the molecules of which reach the crack surfaces by diffusion. If the gas pressure is below the vapor pressure of the anti-agglomeration liquid, the gas molecules disturb the transport of the vapor much less so that the vapor molecules can reach the crack surfaces much more quickly than at normal atmospheric gas pressure. An apparatus suitable for carrying out this variant of the method according to the invention is similar to the one shown in FIG. 7.

In principle any known presses such as roller presses, worm presses, ram presses and the like are suitable for carrying out the method according to the invention as this method is described above and the modifications thereof described. However, they must be adapted to the requirements of the method according to the invention. The disintegration of the agglomerates or briquettes can be effected in any conventional ball mills or impact mills.

What is claimed is:

1. In a method for comminution of particles of brittle materials to obtain product of fine particles the maximum particle size of which is approximately in the range 2 μm–1000 μm comprising:
   (a) stressing a bed of bulk coarse material containing particles of the brittle material to be comminuted which are of a size larger than the fine particles to be obtained, between non-yielding hard surfaces to thereby obtain comminution of the coarse particles into finer fragments along with a agglomeration of finer fragments; and
   (b) subsequently disintegrating the resulting agglomerates to obtain the product containing the fine fragments, the improvement comprising:
   (c) carrying out said stressing of said bed of material by subjecting said bed to a pressure of at least 500 kg/cm² between said non-yielding surfaces; and
   (d) carrying out said stressing in a single pass, whereby the total energy required comminute said particles will be substantially reduced.

2. The method according to claim 1, comprising carrying out said stressing of said bed by subjecting said bed to a pressure of at least 800 kg/cm².

3. The method according to claim 1 and further including at least partially wetting the particles in said bed of bulk material with a liquid no later than the time of carrying out said stressing.

4. The method according to claim 1 and further including the step of exposing said particles of said bed to the vapor of an anti-agglomeration liquid no later than at the time of carrying out said stressing.

5. The method according to claim 4 comprising carrying out said stressing in a pressure chamber containing a vapor pressurized to above atmospheric pressure.

6. The method according to claim 4 comprising carrying out said stressing in a pressure chamber and further including maintaining a gas pressure in said chamber which is less than one atmosphere.

7. The method according to claim 4 comprising carrying out said stressing in a pressure chamber and further including maintaining a gas pressure in said chamber which is less than the partial pressure of said vapor of said anti-agglomeration liquid.

8. The method according to claim 3 comprising carrying out said stressing in a pressure chamber with said liquid pressurized to a pressure above atmospheric pressure and further including the step of first charging said liquid with a soluble gas before wetting said particles.

9. The method according to claim 8 and further including the step of instantaneously reducing said pressure after said single pass of stressing.

10. The method according to claim 1 comprising carrying out said stressing utilizing a roller mill with cylindrical rotors.

11. The method according to claim 1 comprising carrying out said stressing in a roller briquetting press.

12. The method according to claim 1 comprising carrying out said stressing utilizing a ram press.

13. The method according to claim 1, wherein said step of disintegrating comprises impact stressing.

14. The method according to claim 13, wherein said impact stressing is carried out in an impact mill.

15. The method according to claim 1 comprising disintegrating the resulting agglomerate utilizing a combined compression-sheer stressing.

16. The method according to claim 15 comprising carrying out said compression-sheer stressing in a ball mill.

17. The method according to claim 1 and further including the step of wetting said agglomerates with a liquid.

18. The method according to claim 1 for the comminution of raw materials for cement production selected from a group consisting of cement clinker, ores, coals, lime, bauxite, dolomite, and alkaline earth carbonates comprising subjecting said particles to a pressure of 800 kg/cm² in said step of stressing.

19. The method according to claim 18 comprising carrying out said step of stressing in a roller mill and said step of disintegrating in a ball mill.

20. The method according to claim 18 comprising carrying out said step of stressing in a roller mill and said step of disintegrating in an impact mill.

21. The method according to claim 1 for the very fine comminution of material selected from the group consisting of quartz, limestone, and feldspar wherein said stressing is carrying out by applying a pressure of at least 1500 kg/cm² to said particles.

22. The method according to claim 21 comprising carrying out said disintegrating utilizing a ball mill.

23. The method according to claim 21 comprising carrying out said disintegrating using an impact mill.

24. The method according to claim 1 comprising selecting the compression force for carrying out said stressing to be of sufficient magnitude so as to result in at least 30% of the fragments obtained having the desired degree of fineness of the final product.

25. The method according to claim 1 and further including:
(a) classifying the disintegrated agglomerates to remove the product containing the fine fragments; and
(b) recirculating the coarse material which is left to the bed of bulk coarse material.

* * * * *

UNITED STATES PATENT AND TRADEMARK OFFICE
CERTIFICATE OF CORRECTION

PATENT NO. : 4,357,287
DATED : November 2, 1982
INVENTOR(S) : Klaus Schonert

It is certified that error appears in the above—identified patent and that said Letters Patent is hereby corrected as shown below:

Column 1, line 33: change "100" to --1000--;

Column 3, line 49: change "2000" to --20,000--;

Column 4, line 4: after the first recitation of "in", insert --the first step--.

Signed and Sealed this

Tenth Day of May, 1988

Attest:

DONALD J. QUIGG

Attesting Officer

Commissioner of Patents and Trademarks